US006789916B2

(12) United States Patent
Ruggles (10) Patent No.: US 6,789,916 B2
(45) Date of Patent: Sep. 14, 2004

(54) PORTABLE LAMP POST ASSEMBLY (75) Inventor: Patrick H. Ruggles, Solon, OH (US)

(73) Assignee: Adjusta-Post Manufacturing Company, Inc., Norton, OH (US)

( * ) Notice: Subject to any disclaimer, the term of this patent is extended or adjusted under 35 U.S.C. 154(b) by 0 days.

(21) Appl. No.: 10/177,716

(22) Filed: Jun. 21, 2002

(65) Prior Publication Data

US 2003/0235054 A1 Dec. 25, 2003

(51) Int. Cl.$^7$ .............................................. F21V 33/00
(52) U.S. Cl. ....................... 362/154; 362/122; 362/431; 248/156; 47/66.6; 47/67
(58) Field of Search ................................ 362/122, 123, 362/154, 156, 253, 413, 431, 155; D26/55; 47/66.1, 66.6, 41.01, 67; 248/156; 52/726.4

(56) References Cited

U.S. PATENT DOCUMENTS

| 884,924 A | * | 4/1908 | Helmschmied | 47/66.6 |
| 3,747,268 A | * | 7/1973 | Linder | 47/67 |
| 3,906,664 A | | 9/1975 | Hall | |
| 3,939,338 A | | 2/1976 | Giammalvo | |
| 4,765,277 A | * | 8/1988 | Bailey et al. | 248/156 |
| 4,847,741 A | | 7/1989 | Boettinger | |
| 5,121,313 A | | 6/1992 | Chang | |
| 5,741,061 A | | 4/1998 | Lehmann et al. | |
| 5,879,071 A | | 3/1999 | Sanford, Jr. | |
| 5,911,495 A | | 6/1999 | Midiri, Jr. | |
| 5,951,154 A | | 9/1999 | Carel et al. | |
| 6,076,940 A | | 6/2000 | Sanford, Jr. | |
| 6,085,459 A | | 7/2000 | Conner | |
| 6,217,198 B1 | | 4/2001 | Midiri, Jr. | |
| 6,250,770 B1 | | 6/2001 | Countryman et al. | |
| 6,513,284 B1 | * | 2/2003 | Sandlin | 47/66.6 |
| 2002/0005013 A1 | | 1/2002 | Taylor | |

OTHER PUBLICATIONS

Patio Living Concepts, 12 pages, (copyright 2001), printed from the Internet May 17, 2002.
Portable Patio–Lite Planter, 1 page, instructions for applicant's prior model, (copyright 1997).

* cited by examiner

Primary Examiner—Stephen F. Husar
(74) Attorney, Agent, or Firm—Hahn Loeser & Parks, LLP; Robert J. Clark

(57) ABSTRACT

A portable lamp post assembly which comprises a monolithic container and lamp post support, a lamp post attached to the lamp post support, and a fixture attached to the lamp post. The container comprises a bottom, upstanding walls extending from the outer periphery of the bottom, and a boss projecting upwards from the bottom. The fixture may be one or more of several items including a light. The container may be used as a planter or storage container.

32 Claims, 6 Drawing Sheets

PORTABLE LAMP POST ASSEMBLY

FIELD OF THE INVENTION

The present invention relates generally to portable lamp post assemblies and more particularly pertains to a new portable lamp post assembly which comprises a monolithic container having a lamp post support boss, a lamp post attached to the lamp post support boss, and a fixture attached to the lamp post.

BACKGROUND OF THE INVENTION

In the past, lamp post planters typically were fixed by the location of the lamp post. A lamp post shell was simply placed around the base of the fixed lamp post. More recently, portable lamp post light planters have been developed for temporary use on patios, decks, and the like. These devices help provide a portable outdoor light which also is aesthetically pleasing by having a planter as a base which can be filled with flowers. However, these portable planter/light combinations have typically been complex to manufacture, assemble, and have positioned the power cord through the wall of the planter elevated off of the floor where it is aesthetically unpleasing, or have housed the power cord in an elevated position in the planter where it must be protected.

Another problem with prior art portable lamp post lights is that once the planter is filled with soil, the lamp post light weighs so much that it is no longer portable. This is especially problematic with the elderly. The lamp post light is then essentially fixed in position until the soil is removed. This presents another problem in inclement weather. The lamp post may need to be stored to prevent high winds from knocking over the lamp post light, however, the weight of the lamp post light planter makes it difficult or impossible for some users.

Accordingly, there remains a need in the art for a new lamp post assembly which overcomes one or more of the problems identified in the prior art.

SUMMARY OF THE INVENTION

The present invention overcomes one or more of these and other problems in the prior art by providing a lamp post assembly comprising an upwardly opening monolithic container having a bottom, upstanding walls extending from the outer periphery of the bottom, and a boss projecting upwards from the bottom; a lamp post having a first end and a second end, wherein the first end is formed to fit over the boss of the container; and a fixture attached to the second end of the lamp post.

The present invention also overcomes one or more of these and other problems in the prior art by providing a method for assembling a lamp post assembly comprising the steps of (1) providing a container having a bottom, upstanding walls extending from the outer periphery of the bottom, and a boss projecting upwards from the bottom; (2) providing a lamp post comprising a first end and a second end; (3) positioning the first end over the boss of the container; (4) providing a fixture; and (5) attaching the fixture to the second end of the lamp post.

BRIEF DESCRIPTION OF THE DRAWINGS

Better understanding of the present invention will be had when reference is made to the accompanying drawings, wherein identical parts are identified with identical reference numerals, and wherein.

DETAILED DESCRIPTION OF THE DRAWINGS

Figures 1, 2, 3:
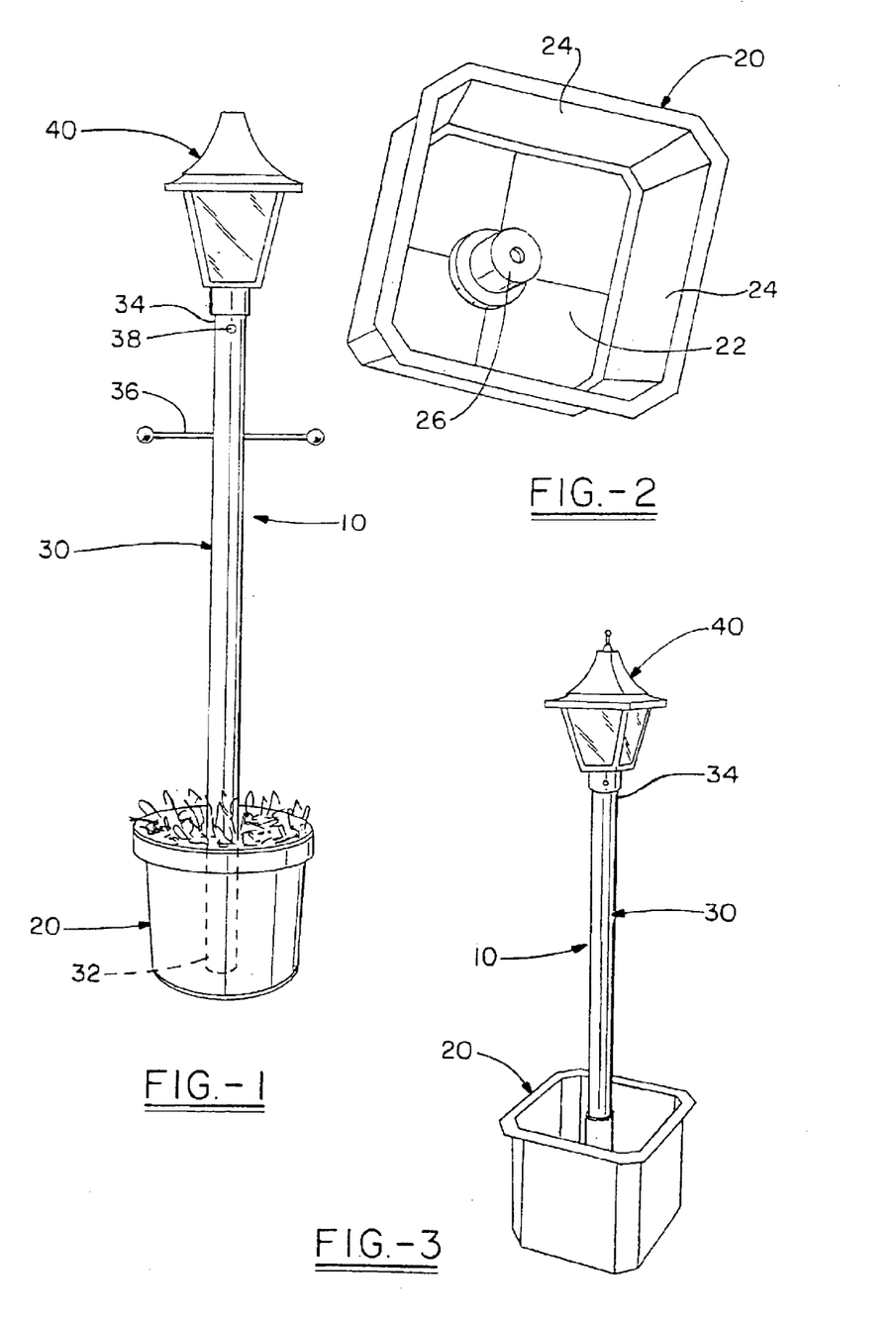
FIG. 1 is a perspective view of the lamp post assembly of the present invention.
FIG. 2 is a perspective view of a container of the lamp post assembly of FIG. 1.
FIG. 3 is a perspective view of a frusto-pyramidical container.

Turning now to FIG. 1, the lamp post assembly 10 of the present invention is shown. The lamp post assembly 10 comprises a container 20, a lamp post 30, and a fixture 40. The lamp post 30 has a first end 32 (not shown) attached to container 20 and a second end 34 attached to fixture 40.

Figures 4, 5, 6:
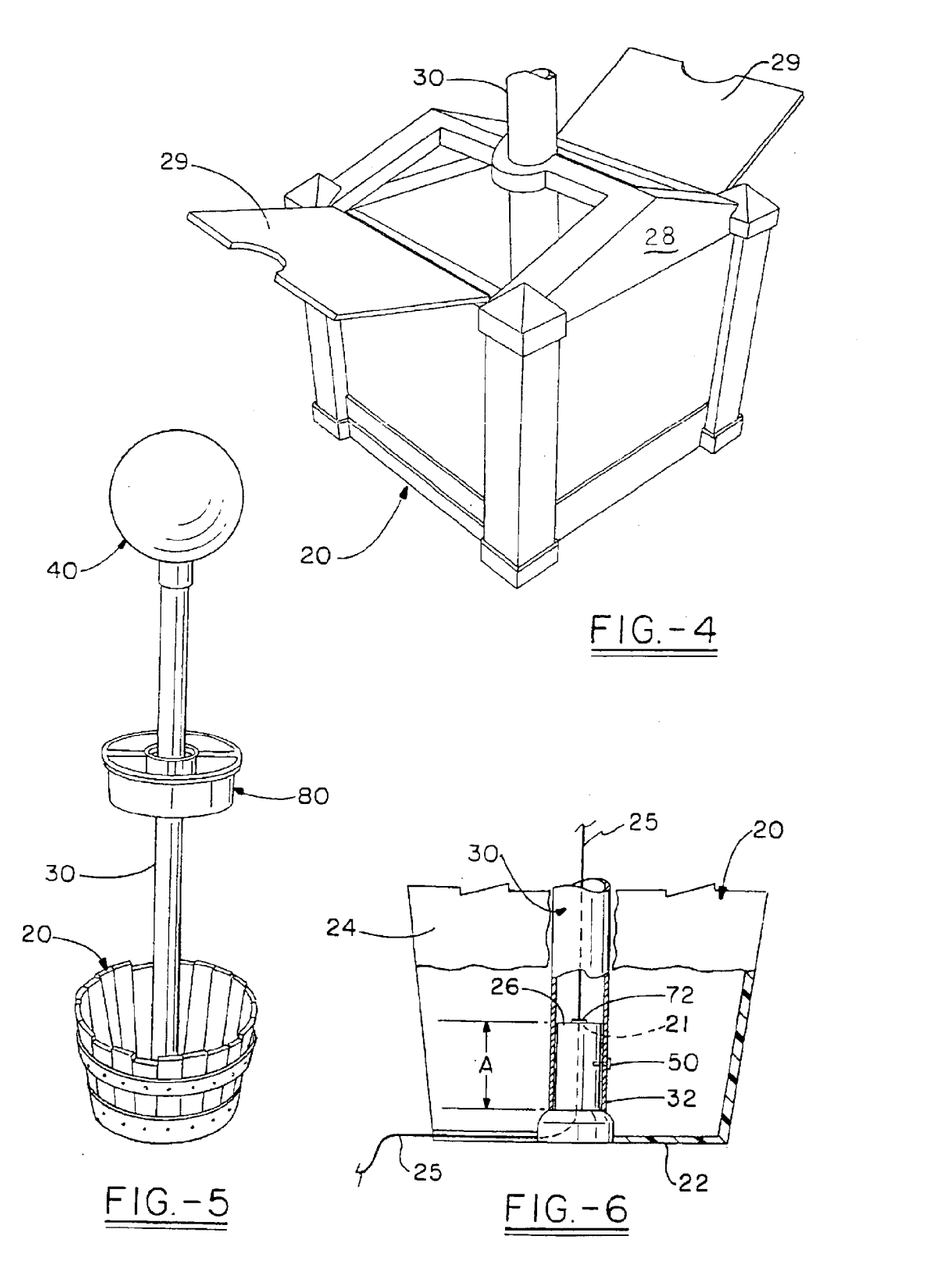
FIG. 4 is a perspective view of a rectangular container including a cover.
FIG. 5 is a perspective view of a barrel shaped container.
FIG. 6 is a cut-away view of a lamp post attached to a container.

A more detailed view of the container is shown in FIG. 2. The container 20 is an upwardly opening monolithic container 20 having a bottom 22, upstanding walls 24 extending from the outer periphery of the bottom 22, and a lamp post support boss 26 projecting upwards from the bottom 22. The container 20 is typically shaped as an inverted frustum, such as those typically used as a planter. For example, FIG. 1 shows a generally frustoconical container 20 used as a planter, FIG. 3 shows a generally frusto-pyramidical container 20, and FIG. 4 shows a rectangular or square box shaped container 20, and FIG. 5 shows a half-barrel shaped container 20. However, it is contemplated that the container 20 can be any shape and have any ornamental design thereon and is not intended to be limited to those shown herein.

Referring now to FIG. 6, the lamp post support boss 26 is formed integral to container 20 and projects upward from the bottom 22. The boss 26 is generally formed such that the first end 32 of the lamp post 30 can be placed over the boss 26. The first end of the lamp post 30 can be secured to the boss 26 with a fastener 50 positioned through the lamp post 30 and the boss 26, respectively.

The lamp post support boss 26 is dimensioned to engage the interior walls of the first end of the lamp post 30 along a predetermined length of engagement A. The length of engagement A of the lamp post support boss 26 and the lamp post 30 is sufficient such that the lamp post support boss 26 will prevent the lamp post 30 from listing, or disengaging from container 20. An engagement length A of three to seven inches has been found to be effective for providing the proper support for a typical lamp post 30 that is about 5 to 7 feet long. The top of the lamp post support boss 26 includes an aperture 21 through which a strain relief mechanism 72 is attached to prevent the cord 25 from being pulled out of the assembly 10.

The container 20 can be used for a variety of purposes. When used as a planter, the container 20 is filled with potting soil in which flowers are planted. Gravel or sand can be used underneath the potting soil to provide additional weight for stability purposes. That container 20 can also be used as an ice bucket to keep cans beverages or the like cold. It is also contemplated that the container 20 could be used in conjunction with a cover 28 to store birdseed as shown in FIG. 4. The cover 28 includes at least one access panel 29 to allow the user to open and close the cover 28. This would be especially useful when the fixture 40 is a bird feeder.

Figures 7, 8, 9, 10:
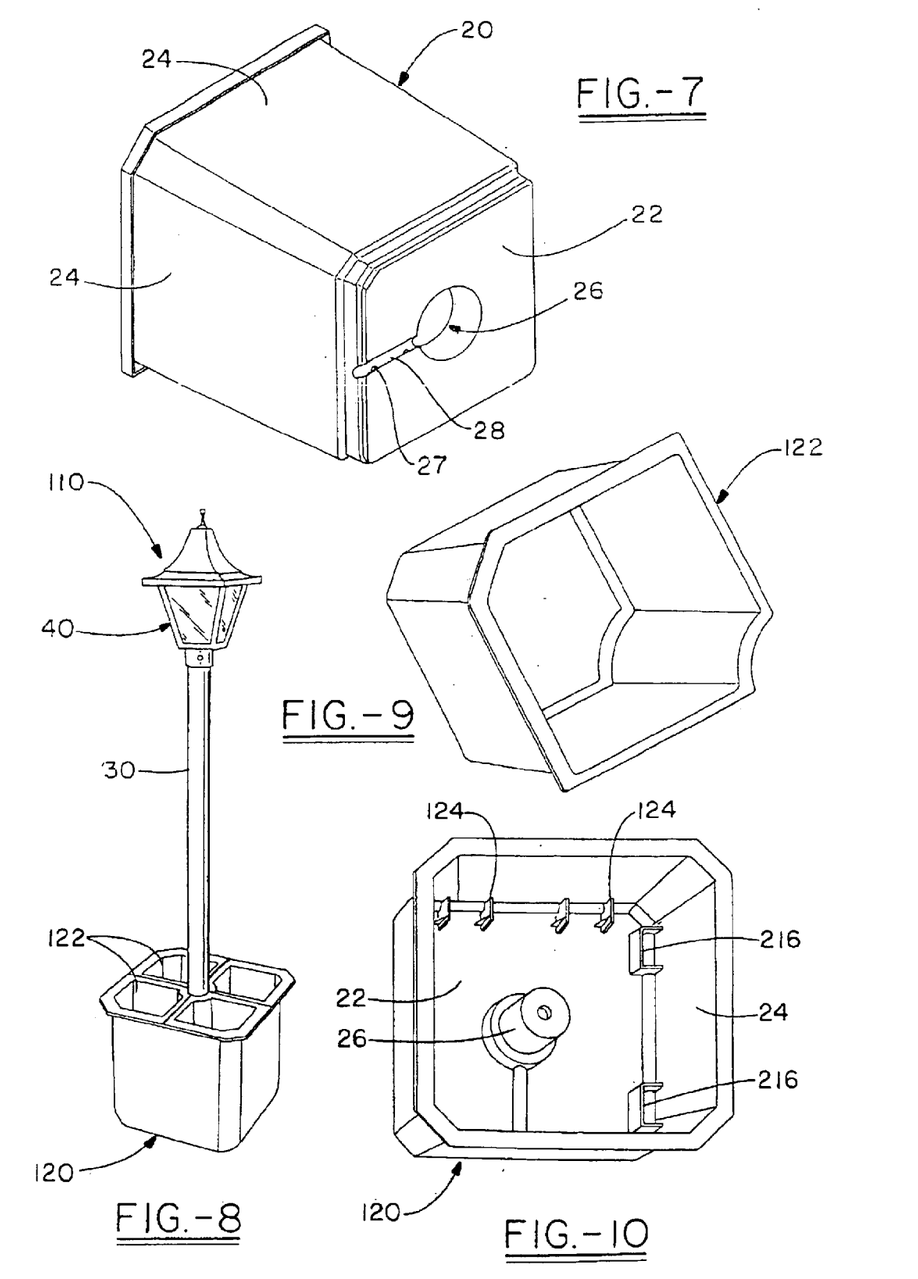
FIG. 7 is a perspective view of the underside of the bottom of the container having a contoured cord guide.
FIG. 8 is a perspective view of an alternate embodiment of the present invention showing a container having a plurality of pods inserted therein.
FIG. 9 is a perspective view of a container pod as shown in the alternate embodiment of FIG. 8.
FIG. 10 is a perspective view of the interior of a container having support structures for pods and a connective anchor for a trellis.

When container 20 is used as the lamp post assembly 10 having a light as the fixture 40, a problem exists as to where to put the cord 25. Referring now to FIG. 7 the underside of the bottom 22 of the container 20 is shown. A contoured cord guide 28 is formed along the underside of the bottom 22 such that the cord can be placed within the guide and up through the lamp post support boss 26, through the lamp post 30 and attached to light fixture 40 or a switch 38 attached to the lamp post 30. The contoured cord guide 28 allows the cord 25 to be placed along the floor where it is less conspicuous and has less opportunity to be a hazard in comparison to a cord 25 that is placed through the upstanding walls 24 of the container 20. In addition, the cord 25 will not obstruct the interior of the container 20. The contoured cord guide 28 may include projections 27 to keep the cord 25 in the guide 28.

In an alternate embodiment of the present invention as shown in FIGS. 8 and 9, the container 120 includes a plurality of removable subcontainers or pods 122. The pods 122 comprise upwardly opening containers which are formed to be removably insertable between the upstanding walls 24 of the container 120 and the lamp post support boss 26. The pods 122 are formed generally as sections of the volume between the outstanding walls 24 of the container 120 in the lamp post support boss 26. The pods 122 enable items placed in the container 120 to be segregated for whatever reason. For example, when using the pods 122 as planters, different color or types of flowers could be planted in each pods 122. The pods 122 also enable the user to remove the pods from the container 120 and work on the contents of the pod 122 in a more convenient location instead of having to been down over the container 120 located on the floor. Another advantage of using pods 122 is that the weight of the pods is significantly less than the weight of the entire container 120. When lamp post container assembly 110 needs to be moved to different location, the user can simply remove the pods 122 and then easily move the lamp post assembly 110 having an empty container 120.

Referring now to FIG. 10, when using the pod configuration, container 120 preferably includes internal support structures 124 generally along the bottom 22 and/or along the interface of the bottom 22 with the upstanding walls 24 and/or the interface of the bottom 22 with the lamp post support boss 26. The internal support structures 124 help properly position and support the pods 122 within the container 120.

Figure 11:
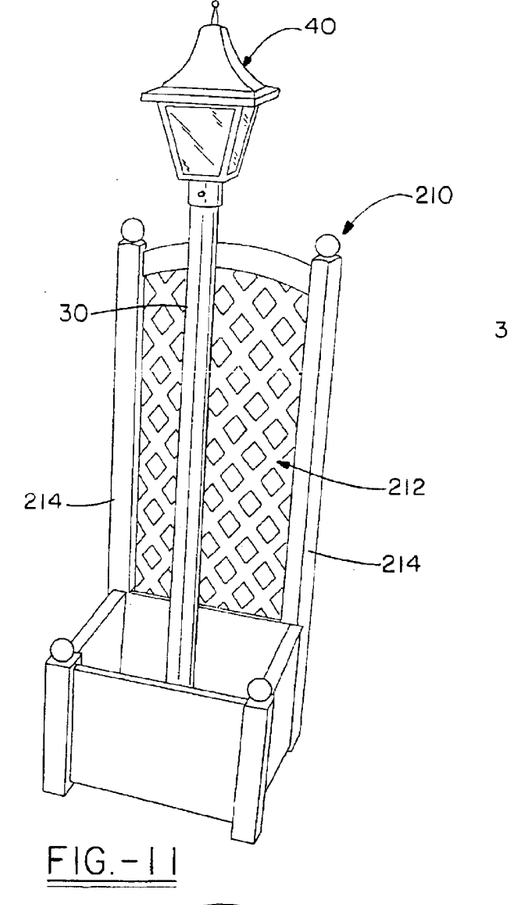
FIG. 11 is a perspective view of a container having an attached trellis.

Referring now to FIG. 11, in another embodiment of the present invention, the lamp post assembly 210 includes a trellis 212. The trellis 212 includes a plurality of leg members 214 which are removably attached to a corresponding number of trellis mounting anchor structures 216 within container 120 shown in FIG. 10. The trellis 212 provides another level of aesthetic possibilities such that a vine type of plant can be planted in the container 120.

The container 20, 120 is typically made of a plastic material such as polypropylene or the like. This enables the container to be light weight for shipping purposes, and for moving the lamp post assembly 10, 100, while also being durable and strong for use as a planter or the like. The container 20, 120 may optionally have drainage holes for use as a planter. However, the container 20, 120 is not limited to been made of a specific material and it is contemplated that any suitable material may be used.

Figure 12:
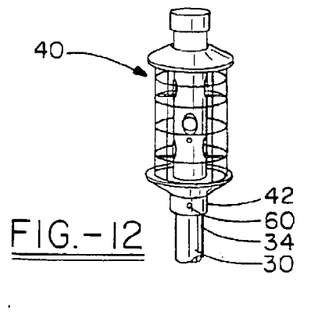
FIG. 12 is a perspective view of a fixture in the form of a birdfeeder.
Figure 13:
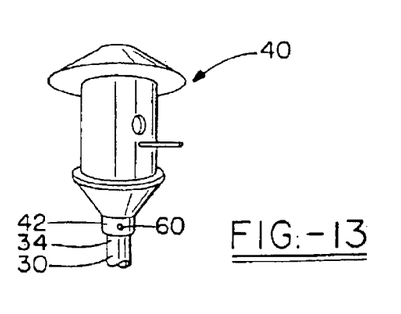
FIG. 13 is a perspective view of a fixture in the form of a birdhouse.

The fixture 40 may be any one of a number of different fixtures including a light fixture 40 as shown in FIG. 1, an ornamental ball fixture 40 as shown in FIG. 4, bird feeder 40 as shown in FIG. 12, and a bird house 40 as shown in FIG. 13. The fixture 40 comprises a lamp post engagement portion 42 which allows the fixture 40 to be attached to the second end 34 of the lamp post 30. The lamp post engagement portion 42 is typically a receiving collar 42 which is attached to the bottom of the fixture 40. The receiving collar 42 is formed to fit over the second end 34 of the lamp post 30 and is secured thereto with a fastener 60.

Figure 14:
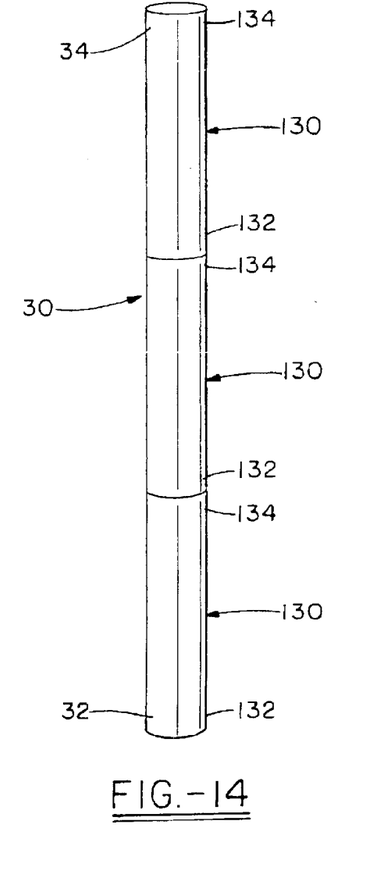
FIG. 14 is an elevational view of the lamp post used in conjunction with the present invention.
Figure 15:
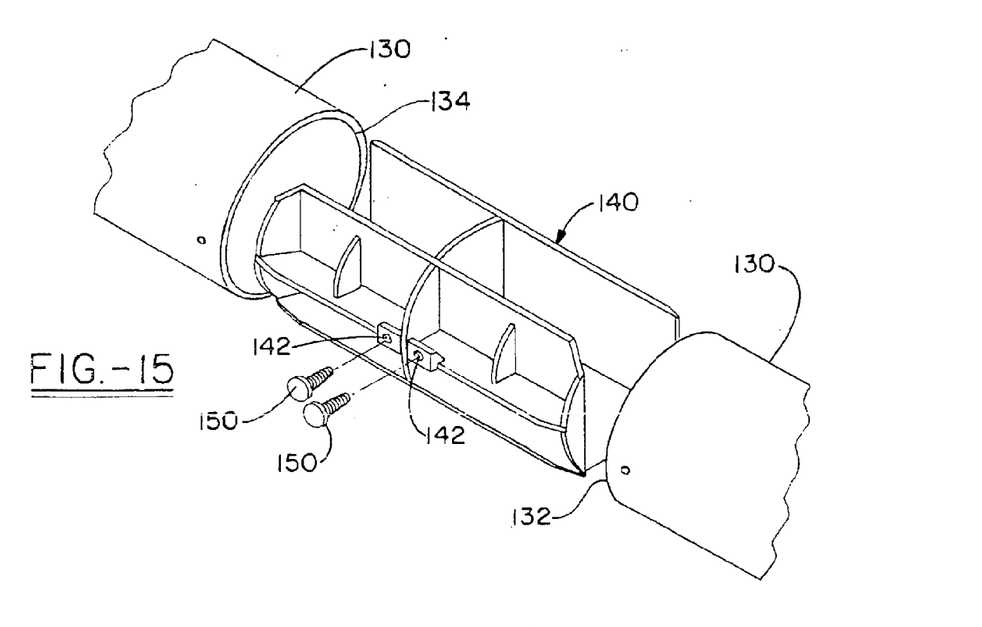
FIG. 15 is a cutaway view of two lamp post segments connected end to end by an internal coupling device.

Referring now to FIG. 14, the lamp post 30 of the present invention is shown. The lamp post 30 generally comprises a first end 32 and a second end 34. The lamp post 30 is typically made of metal such as aluminum or steel which is then surface treated and/or powder coated or painted to the desired color, or made of a colored plastic material. However, the lamp post is not limited to these materials and it is contemplated that any suitable material may be substituted. The lamp post 30 can be manufactured as one-piece or as a plurality of lamp post sections 130 which are assembled to form the lamp post 30. Lamp post portions 130 each have a first end 132 and a second end 134. When manufactured out of a metallic material, the lamp post portions 130 are typically connected end-to-end by using an internal coupling device 140. And as shown in FIG. 15, the internal coupling device 140 is formed to be placed internally at least part way in each adjacent lamp post section 130, and preferably halfway in each. The internal coupling device 140 includes apertures 142 which are aligned with corresponding apertures on each of the adjacent lamp post sections 130. A fastener 150 is used to secure each lamp post section 130 to the internal coupling device 140.

Figure 16:
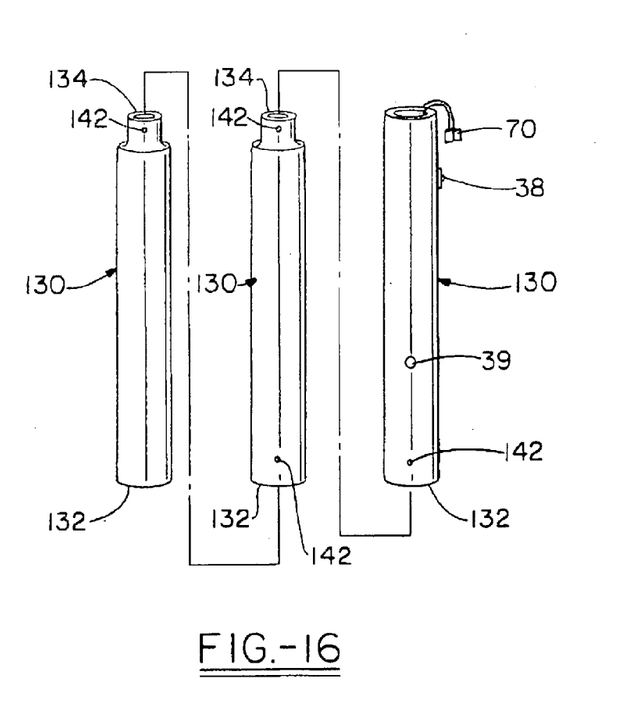
FIG. 16 is a perspective view of a three lamp post segments having a swaged end connection.

An alternative method of connecting the lamp post sections 130 is shown in FIG. 16 and involves using lamp post sections 130 formed such that a second end 134 of the lamp post section is swaged to form an internal coupling end dimensioned to fit internally into a first end 132 of an adjacent lamp post section. The first end 132 includes an aperture 142 enabling a fastener 150 to be used to secure the adjacent lamp post sections 130. Note that the second end 134 of one of the lamp post sections 130 is not swaged as it connects to the fixture 40. Quick wire connectors 70 for switch 38 are shown protruding from the second end 134 for connection to the end of the power cord 25 and connection to an electric cord for the fixture 40 for when the lamp post assembly 10 includes a light.

Figure 17:
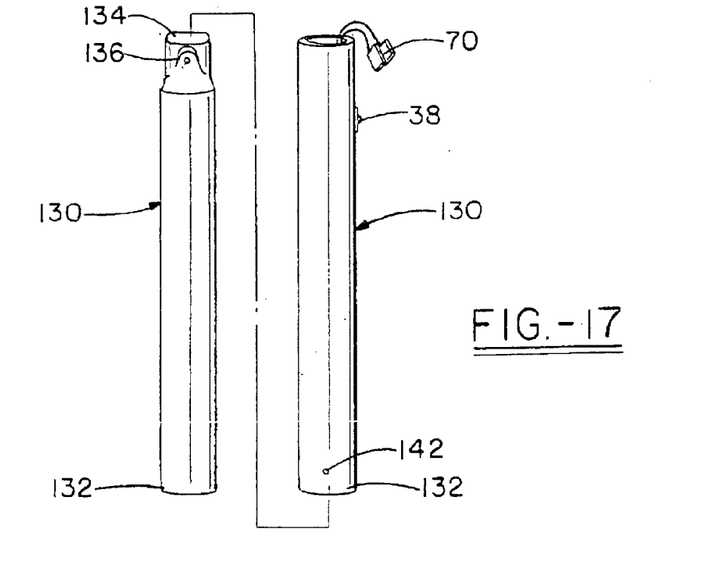
FIG. 17 is a perspective view of a snap together coupling of two lamp post segments.

When manufactured out of a plastic material or the like, another coupling may be used as shown in FIG. 17. The first end 132 of the lamp post section 130 comprises an internal coupling end dimensioned to fit internally into a second end 134 of an adjacent lamp post section 130 and as best shown in FIG. 17. The internal coupling end 132 of each lamp post section 130 comprises a outwardly biased projection which is engageable with an aperture 134 in the second end 132 of an adjacent lamp section 130 in a manner connecting the adjacent lamp post sections 130.

The lamp post 30 may also include a cross member 36 typical of lantern-style lamp posts inserted through apertures 39 in the lamp post 30. The cross member 36 may also be used to support hanging baskets, small seasonal banners, or the like. When used in conjunction with a light fixture 40, the lamp post 30 may also include a switch 38 attached to the lamp post 130 to turn on and off the light. Switch 38 may be a dimmer switch, a simple on/off switch, a remote control sensor which the user can activate remotely, or any other type of switch 38.

In another embodiment of the present invention, a second container 80 is removably attached to the lamp post 130 in a location between container 20 and fixture 40 as shown in FIG. 5. Second container 80 may be used for planting flowers that hanging down over the edge of the second container 80 towards container 20. While second container 80 may be attached at any location on lamp post 30 between the first end 32 and the second end 34, it is preferred that the second container 80 is attached between to adjacent lamp post sections 130.

Figure 18:
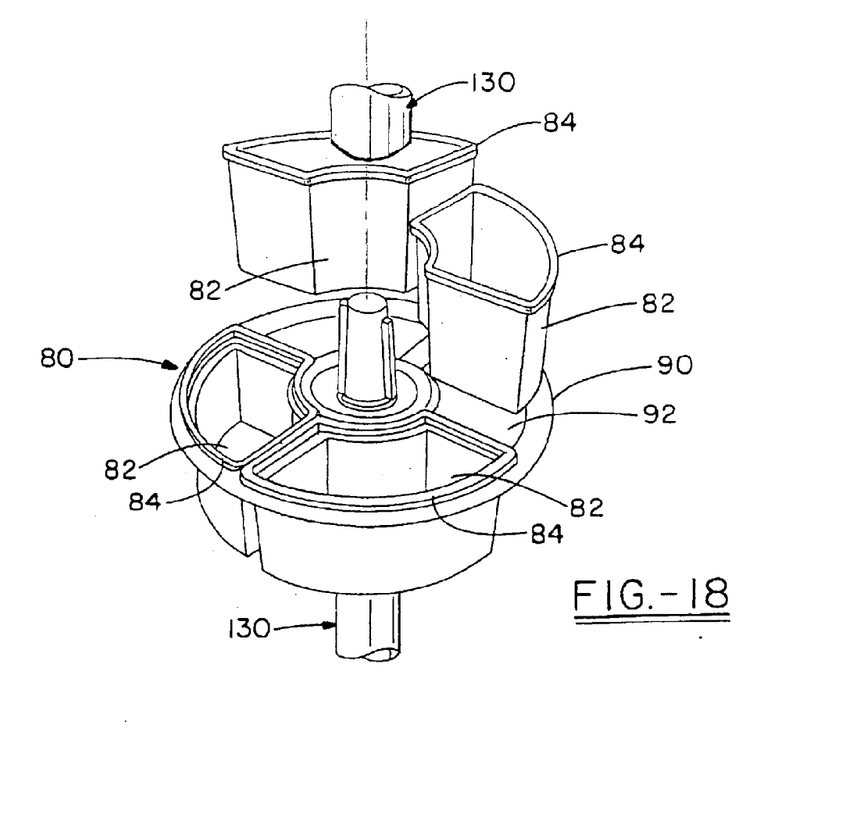
FIG. 18 is a perspective view of a container tray attached to the lamp post having a plurality of subcontainers insertable into apertures of the tray.

In another embodiment of the present invention as shown in FIG. 18, the second container 80 is formed by a plurality of removable subcontainers or pods 82. The pods 82 comprise upwardly opening containers having a support lip 84 about the top thereof, which are formed to be removably insertable into a container or support tray 90 having a plurality of corresponding apertures 92 such that the lip 84 of the pods 82 engages and is supported by the support tray 90. The pods 82 may be formed in any practical shape which corresponds to be shape of the aperture 92 in the support tray 90. The pods 82 enable items placed in the container 80 to be segregated for whatever reason. The pods 82 also enable the user to remove the pods from the support tray 90 to work on the contents of the pod 82 in a more convenient location.

As has been shown above, many variations of lamp post assembly 10 are possible. It is contemplated that additional changes or variations could be shown without departing from the scope of the present invention such as attaching wheels to the bottom of the container 20. Although the present invention has been described above in detail, the same is by way of illustration and example only and is not to be taken as a limitation on the present invention. Accordingly, the scope and content of the present invention are to be defined only by the terms of the appended claims.

What is claimed is:

1. A lamp post assembly comprising:
    a container having a bottom, upstanding walls extending from the outer periphery of the bottom, and a boss projecting upwards from the bottom;
    a lamp post comprising having a first end and a second end, wherein the first end is formed to fit over the boss of the container;
    a fixture attached to the second end of the lamp post; and
    a plurality of upwardly opening subcontainers removably insertable between the upstanding walls of the container and the lamp post.

2. The lamp post assembly of claim 1, wherein the fixture is a light fixture.

3. The lamp post assembly of claim 1, wherein the fixture is an ornamental ball.

4. The lamp post assembly of claim 1, wherein the fixture is a bird feeder.

5. The lamp post assembly of claim 1, wherein the fixture is a bird house.

6. The lamp post assembly of claim 1, further comprising a second container attached to the lamp post at a location between the first end and the second end of the lamp post.

7. The lamp post assembly of claim 6, wherein a plurality of subcontainers are removably attached to the second container.

8. The lamp post assembly of claim 1, further comprising a cross arm transversely positioned through the lamp post.

9. The lamp post assembly of claim 1, further comprising a cover positioned over the opening of the container, wherein at least a portion of the cover is movable to allow access to the container.

10. The lamp post assembly of claim 1, further comprising a trellis portion extending upward from and attached to the container.

11. The lamp post assembly of claim 1, wherein the lamp post comprises a plurality of lamp post sections attached to each other and positioned end to end.

12. The lamp post assembly of claim 11, wherein each adjacent lamp post section end is attached to a coupling device positioned internally at least part way in each adjacent lamp post section.

13. The lamp post assembly of claim 11, wherein at least one end of each lamp post section comprises an internal coupling end dimensioned to fit internally into a second end of an adjacent lamp post section.

14. The lamp post assembly of claim 13, wherein the internal coupling end of each lamp post section comprises a outwardly biased projection which is engageable with an aperture in the second end of an adjacent lamp section in a manner connecting the adjacent lamp post sections.

15. The lamp post assembly of claim 1, wherein the container further comprises a channel formed generally radially along the underside of the bottom to provide a contoured cord guide through and between the upstanding walls and the boss.

16. The lamp post assembly of claim 15, further comprising an electrical power cord insertable into the channel formed along the underside of the bottom of the container and extending upward to the fixture through the lamp post and the boss of the container.

17. The lamp post assembly of claim 16, wherein a strain relief device is mounted to an aperture on the top of the boss and provides strain relief for the power cord.

18. The lamp post assembly of claim 1, wherein the container further comprises a plurality of support structures formed integral to the container and adapted to support the removably insertable subcontainers.

19. A lamp post assembly comprising:
    an upwardly opening monolithic container having a bottom, upstanding walls extending from the outer periphery of the bottom, and a boss projecting upwards from the bottom;
    a lamp post comprising having a first end and a second end, wherein the first end is formed to fit over the boss of the container;

a plurality of upwardly opening subcontainers removably insertable between the upstanding walls of the monolithic container and the lamp post; and a fixture attached to the second end of the lamp post.

20. The lamp post assembly of claim 19 further comprising a second container attached to the lamp post at a location between the first end and the second end of the lamp post.

21. The lamp post assembly of claim 20, wherein a plurality of subcontainers are removably attached to the second container.

22. The lamp post assembly of claim 19, further comprising a trellis portion extending upward from and attached to the container.

23. The lamp post assembly of claim 19, wherein the container further comprises a channel formed generally radially along the underside of the bottom to provide a contoured cord guide through and between the upstanding walls and the boss.

24. The lamp post assembly of claim 23, further comprising an electrical power cord insertable into the channel formed along the underside of the bottom of the container and extending upward to the fixture through the lamp post and the boss of the container.

25. The lamp post assembly of claim 24, wherein a strain relief device is mounted to an aperture on the top of the boss and provides strain relief for the power cord.

26. The lamp post assembly of claim 19, wherein the container further comprises a plurality of support structures formed integral to the container and adapted to support the removably insertable subcontainers.

27. A lamp post assembly comprising:

an upwardly opening monolithic container having a bottom, upstanding walls extending from the outer periphery of the bottom, a boss projecting upwards from the bottom, and a channel formed generally radially along the underside of the bottom to provide a contoured cord guide through and between the upstanding walls and the boss;

a lamp post comprising having a first end and a second end, wherein the first end is formed to fit over the boss of the container;

a light fixture attached to the second end of the lamp post; and an electrical power cord insertable into the channel formed along the underside of the bottom of the container and extending upward to the light fixture through the lamp post and the boss of the container.

28. The lamp post assembly of claim 27, wherein a strain relief device is mounted to an aperture on the top of the boss and provides strain relief for the power cord.

29. The lamp post assembly of claim 27, wherein the lamp post further comprises a switch attached to the lamp post.

30. The lamp post assembly of claim 29, wherein the switch is a dimmer switch.

31. A lamp post assembly comprising:

a container having a bottom, upstanding walls extending from the outer periphery of the bottom, and a boss projecting upwards from the bottom;

a lamp post comprising having a first end and a second end, wherein the first end is formed to fit over the boss of the container;

a fixture attached to the second end of the lamp post;

a tray attached to the lamp post at a location between the first end and the second end of the lamp post, wherein the tray has a plurality of apertures formed therein; and a plurality of subcontainers are removably insertable within the apertures of the tray such that the subcontainers are supported by the tray.

32. A method for assembling a lamp post assembly comprising:

providing an upwardly opening monolithic container having a bottom, upstanding walls extending from the outer periphery of the bottom, a boss projecting upwards from the bottom, and a channel formed generally radially along the underside of the bottom to provide a contoured cord guide through and between the upstanding walls and the boss;

providing an electrical power cord;

inserting a portion of the power cord into the channel;

providing a lamp post comprising a first end, a second end, and a switch attached generally near the second end;

positioning one end of the power cord upward through the boss and through an interior of the lamp post;

positioning the first end of the lamp post over the boss of the container;

attaching the first end of the lamp post to the boss of the container;

electrically connecting the one end of the power cord to the switch;

providing a light fixture;

electrically connecting the light fixture to the switch;

attaching the light fixture to the second end of the lamp post.

* * * * *